(12) United States Patent
Roberts et al.

(10) Patent No.: US 8,585,896 B2
(45) Date of Patent: Nov. 19, 2013

(54) APPARATUS AND METHOD FOR REMOVING IMPURITIES FROM WATER OF WASTEWATER

(75) Inventors: R. Lee Roberts, Rose Valley, PA (US); Mark Kevin Addison, Bear, DE (US)

(73) Assignee: Roberts Marketing DE, Inc., Wilmington, DE (US)

( * ) Notice: Subject to any disclaimer, the term of this patent is extended or adjusted under 35 U.S.C. 154(b) by 292 days.

(21) Appl. No.: 13/067,589

(22) Filed: Jun. 10, 2011

(65) Prior Publication Data

US 2012/0312740 A1     Dec. 13, 2012

(51) Int. Cl.
    *B01D 21/02*       (2006.01)
    *B01D 21/00*       (2006.01)

(52) U.S. Cl.
    CPC .......... *B01D 21/0045* (2013.01); *B01D 21/003* (2013.01); *B01D 21/02* (2013.01); *B01D 2021/0078* (2013.01)
    USPC .......... 210/232; 210/522; 210/532.1; 210/541

(58) Field of Classification Search
    USPC .............. 210/232, 521, 522, 532.1, 540, 541, 210/542, 802
    See application file for complete search history.

(56) References Cited

U.S. PATENT DOCUMENTS

| | | | |
|---|---|---|---|
| 3,494,475 A * | 2/1970 | Hedstrom | ...................... 210/521 |
| 4,089,782 A | 5/1978 | Huebner | |
| 4,865,753 A | 9/1989 | Meurer | |
| 4,889,624 A | 12/1989 | Soriente et al. | |
| 5,049,278 A | 9/1991 | Galper | |
| 5,089,136 A * | 2/1992 | Cyr | ............................... 210/521 |
| 5,391,306 A | 2/1995 | Meurer | |
| 5,839,828 A | 11/1998 | Glanville | |
| 6,217,777 B1 | 4/2001 | Dahlquist et al. | |
| 6,245,243 B1 | 6/2001 | Meurer | |
| 6,783,009 B1 * | 8/2004 | Meurer | ......................... 210/521 |
| 6,817,476 B2 * | 11/2004 | Donnick et al. | .............. 210/522 |

(Continued)

OTHER PUBLICATIONS

"JMS Plate Settler Systems," Jim Myers & Sons, Inc., pp. 1-4, no publication date but believed to be prior art to the subject patent application.
"Accu-Pac Plate Settler System," Brentwood Industries, p. 1, no publication date but believed to be prior art to the subject patent application.

(Continued)

*Primary Examiner* — Christopher Upton
(74) *Attorney, Agent, or Firm* — Merek, Blackmon & Voorhees, LLC

(57) ABSTRACT

A filter or clarification system for removing impurities from a liquid to be treated, i.e., influent. The system preferably includes a chamber for receiving a liquid to be treated. The chamber has a settling assembly including a plurality of inclined settling members forming a plurality of inclined liquid passageways through which the liquid to be treated is directed to remove impurities from the liquid to be treated. Preferably, the headloss of the settling assembly is solely controlled by one or more orifices formed in the settling members, i.e., the settling assembly is free of gaps formed between the settling members that appreciably affect the headloss of the settling system. Support members are provided for each of the settling members to allow the settling members to be easily and readily removed. Preferably, the support members provide sufficient stability to allow an individual to walk on the tops of the settling members. Preferably, the support members are configured to enhance clarification or filtration. It is also preferred that the support members and settling members be configured to permit the settling members to be readily and easily connected to the corresponding support member.

23 Claims, 7 Drawing Sheets

(56) References Cited

U.S. PATENT DOCUMENTS

| | | | |
|---|---|---|---|
| 7,560,035 B1 * | 7/2009 | Meurer | 210/522 |
| 7,850,860 B2 | 12/2010 | Dissinger et al. | |
| 8,317,036 B2 * | 11/2012 | Roberts | 210/521 |
| 2004/0031750 A1 | 2/2004 | Larsson | |
| 2008/0314823 A1 | 12/2008 | Kulick et al. | |

OTHER PUBLICATIONS

Excerpts from website of Meurer Research, Inc.' s web cite, pp. 1 to 4 and pp. 1 to 2, 2004-2005.

FlexKlear Inclined Patent Settler, Self-Cleaning Laminar Flow Settlers for New and Existing Clarifiers, Eimco water Technologies, pp. 1 to 10, 2007.

* cited by examiner

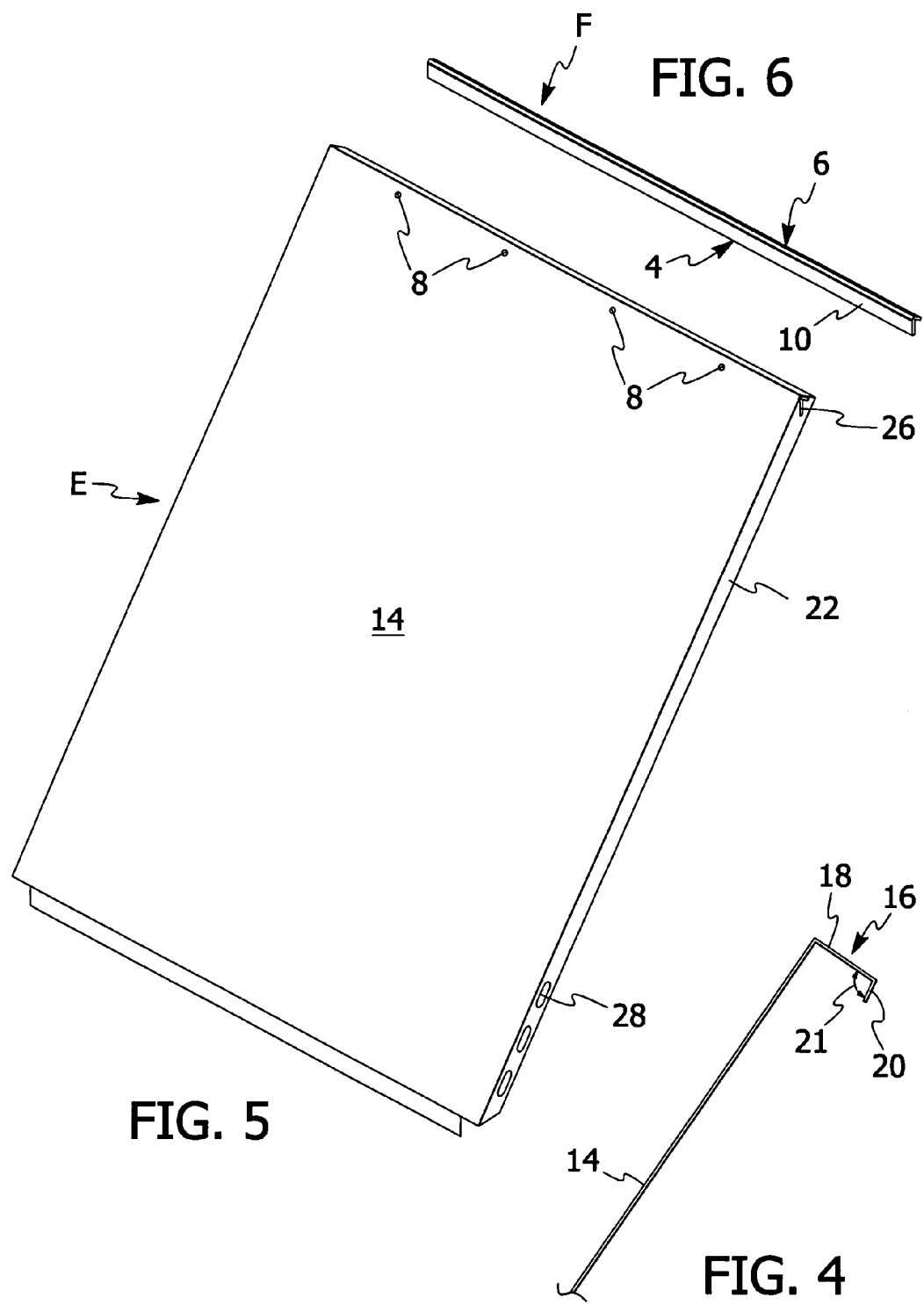

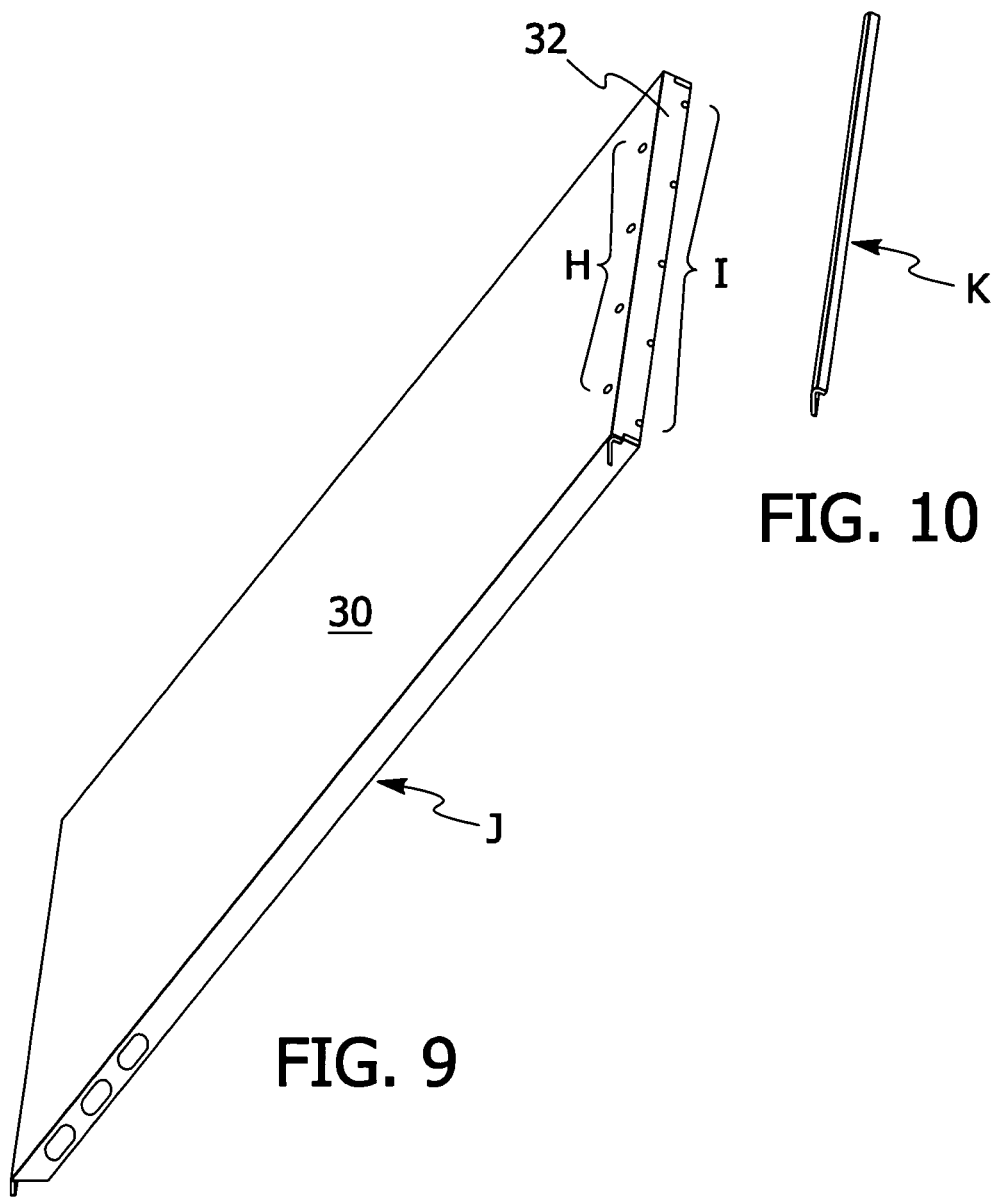

APPARATUS AND METHOD FOR REMOVING IMPURITIES FROM WATER OF WASTEWATER

FIELD OF THE INVENTION

The present invention is directed to an apparatus and method for removing impurities from water and/or wastewater. More specifically, the present invention is directed to a filter system that employs a clarifier or filter having a plurality of inclined liquid flow passages through which a liquid to be clarified or filtered is directed to remove impurities from the liquid. The inclined liquid flow passages can be formed by plate settlers. The clarifier or filter of the present invention may be used with one or more flocculators upstream of the clarifier or filter. The clarifier or filter of the present invention may also be used with one or more additional filter systems downstream of the clarifier or filter.

BACKGROUND OF TILE INVENTION

Filter or clarification systems have employed a settling assembly to remove impurities from water and/or wastewater for a number of years. In these types of filter systems, flat plates are commonly used to drastically reduce the footprint of prior clarification systems that merely included an open basin. The flat plates are commonly mounted at fixed angles to the surface of the liquid to form a plurality of liquid flow channels. The fixed angle of the plates creates overlapping, horizontally projected surfaces that increases the effective settling surface area compared to an open basin. The increased effective settling surface area is desirable as filtering or clarification capacity is proportional to surface area. The liquid to be filtered is directed through the plurality of liquid flow channels to cause the impurities to settle downwardly at the bottom of a detention basin or sludge collection area. The liquid to be filtered can travel upwardly or downwardly through the plurality of liquid flow channels during the filtration or clarification process.

As the liquid flows upwardly or downwardly through the inclined liquid flow passageways, the impurities settle out of the liquid being filtered. However, it is imperative to the effectiveness of the settling system in removing impurities from the liquid being treated that the liquid flow through the inclined liquid flow passageways be controlled to avoid mal-distribution due to, for example, channeling as well as non-laminar flow. Control orifices in settling plates are effective at limiting mal-distribution of the liquid to be treated through the inclined liquid flow passageways. However, prior support devices for the inclined settling plates in which control orifices have been used have a number of disadvantages including the inability to support an individual's weight while walking on the tops of the inclined plates, the inability to be readily removed for cleaning or replacement and the inability to enhance the clarification process. In an attempt to overcome the inability to support the weight of an individual, support systems have been developed that include various types of support members. However, these systems employ large gaps between adjacent settling plates in an attempt to control headloss to avoid mal-distribution. For various reasons including the inability to precisely control the size of the gaps, these systems are not as effective at controlling headloss as orifice type systems. Further, the supports themselves do not increase the settling surface area themselves or otherwise enhance the clarification process.

Hence, there is a need for a settling system that overcomes the aforementioned disadvantages as well as other disadvantages not articulated above.

OBJECTS AND SUMMARY OF THE INVENTION

An object of the present invention is to provide a novel and unobvious apparatus and method for removing impurities from water and/or wastewater.

Another object of a preferred embodiment of the present invention is to provide a filter or clarification system including a settling system having a plurality of inclined plates where each of the inclined plates has at least one orifice through which effluent passes and a support system that provides sufficient support to not only carry the weight of the plates and accumulated sludge but to also allow an individual to walk on the top of the inclined plates.

Still another object of a preferred embodiment of the present invention is to provide a filter or clarification system including a settling assembly having a support member for each of a plurality of inclined plates that allows each of the inclined plates to be readily removed for servicing or replacement and that provides sufficient structural stability to allow an individual to walk on the tops of the inclined plates but yet the system is free of gaps between adjacent inclined plates that are of sufficient size to affect headloss.

A further object of a preferred embodiment of the present invention is to provide a filter or clarification system including a settling assembly having a support member for each of a plurality of inclined plates where each support member includes a baffle to enhance filtration or clarification of the system. Orifices, ribs (horizontal or vertical orientation or a combination thereof, e.g. a curved or serpentine shaped rib having both horizontal and vertical components) or vanes (horizontal or vertical orientation or a combination thereof, e.g. a curved or serpentine shaped vane having both horizontal and vertical components) may be formed in or on the baffles to further enhance filtration or clarification.

Yet another object of a preferred embodiment of the present invention is to provide a filter or clarification system including a settling assembly having a support member for each of a plurality of inclined plates where the support member includes one or more settling surfaces to increase the effective settling surface area of the system.

Still a further object of a preferred embodiment of the present invention is to provide a filter or clarification system including a settling assembly having a support member for each of a plurality of inclined plates where each of the plurality of inclined plates and support members are configured such that a given inclined plate can be readily and easily attached to a given support member.

Yet still another object of a preferred embodiment of the present invention is to provide a filter or clarification system including a settling assembly having a plurality of settling members forming a plurality of inclined liquid passageway where the settling members have at least two sets of a plurality of control orifices formed therein where one set of control orifices is spaced from another set of control orifices to enhance filtration or clarification.

Still yet a further object of a preferred embodiment of the present invention is to provide a filter or clarification system including a settling assembly configured to prevent gaps of sufficient size to affect headloss from being formed between adjacent plates.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, one preferred embodiment of the present invention is directed to an apparatus for removing impurities from a liquid to be treated. The apparatus includes a chamber for receiving a liquid to be treated. The chamber has a settling assembly. The settling assembly includes a support frame operably associated with a plurality of inclined plates for supporting the plurality of inclined plates in such a manner as to form a plurality of inclined liquid passageways through which the liquid to be treated is directed to cause impurities to settle out of the liquid to be treated. At least one inclined passageway is formed between a pair of adjacent inclined plates. Each of the inclined plates has a flange that rests on an adjacent inclined plate. At least one orifice is formed in each of the plurality of inclined plates through which effluent passes. A support member is operably associated with each of the plurality of inclined plates for supporting a corresponding inclined plate on the support frame. At least a portion of each of the support members abuts an inner surface of a corresponding flange.

Another preferred embodiment of the present invention is directed to an apparatus for removing impurities from a liquid to be treated. The apparatus includes a chamber for receiving a liquid to be treated. The chamber has a settling assembly including a plurality of inclined plates forming a plurality of inclined liquid passageways through which the liquid to be treated is directed to cause impurities to settle out of the liquid to be treated. At least one inclined passageway is formed between a pair of adjacent inclined plates. The clarification enhancement member extends into each of the plurality of inclined liquid passageways for enhancing removal of impurities from the liquid being treated. Each of the clarification enhancement members is disposed such that no portion of the clarification enhancement member extends above a corresponding inclined passageway. At least a portion of each of the filtration enhancement members is spaced from each settling surface formed on a pair of adjacent inclined plates forming a corresponding inclined passageway.

A further preferred embodiment of the present invention is directed to an apparatus for removing impurities from a liquid to be treated. The apparatus includes a chamber for receiving a liquid to be treated. The chamber has a settling assembly including a plurality of inclined plates forming a plurality of inclined liquid passageways through which the liquid to be treated is directed to cause impurities to settle out of the liquid to be treated. At least one inclined passageway is formed between a pair of adjacent inclined plates. Each of the inclined plates has a plurality of orifices through which effluent passes. A filtration enhancement member extends into each of the plurality of inclined liquid passageways for enhancing removal of impurities from the liquid being treated. Each of the filtration enhancement members is a separate piece from a pair of adjacent inclined plates forming a corresponding inclined passageway.

Still another preferred embodiment of the present invention is directed to an apparatus for removing impurities from a liquid to be treated. The apparatus includes a chamber for receiving a liquid to be treated. The chamber has a settling assembly. The settling assembly has a support frame operably associated with a plurality of inclined plates for supporting the plurality of inclined plates in such a manner as to form a plurality of inclined liquid passageways through which the liquid to be treated is directed to cause impurities to settle out of the liquid to be treated. At least one inclined passageway is formed between a pair of adjacent inclined plates. A support member is operably associated with each of the plurality of inclined plates for supporting a corresponding inclined plate on the support frame. Each of the inclined plates and corresponding support members is formed such that a corresponding support member can be removably attached to a corresponding inclined plate without any additional means other than the corresponding inclined plate and the corresponding support member.

Still a further preferred embodiment of the present invention is directed to an apparatus for removing impurities from a liquid to be treated. The apparatus includes a chamber for receiving a liquid to be treated. The chamber has a settling assembly. The settling assembly has a support frame operably associated with a plurality of inclined plates for supporting the plurality of inclined plates in such a manner as to form a plurality of inclined liquid passageways through which the liquid to be treated is directed to cause impurities to settle out of the liquid to be treated. At least one inclined passageway is formed between a pair of adjacent inclined plates. A support member is operably associated with each of the plurality of inclined plates for supporting a corresponding inclined plate on the support frame. A first portion of at least one of the support members extends into a corresponding inclined passageway. The first portion has a settling surface spaced from a settling surface of an inclined plate supported by the support member having the first portion.

Yet another preferred embodiment of the present invention is directed to an apparatus for removing impurities from a liquid to be treated. The apparatus includes a chamber for receiving a liquid to be treated. The chamber has a settling assembly. The settling assembly has a support frame operably associated with a plurality of inclined plates for supporting the plurality of inclined plates in such a manner as to form a plurality of inclined liquid passageways through which the liquid to be treated is directed to cause impurities to settle out of the liquid to be treated. At least one inclined passageway is formed between a pair of adjacent inclined plates. A support member is operably associated with each of the plurality of inclined plates for supporting a corresponding inclined plate on the support frame. A baffle extends downwardly into one of the inclined passageways. The baffle is disposed in an upper portion of a corresponding inclined passageway.

Yet a further preferred embodiment of the present invention is directed to an apparatus for removing impurities from a liquid to be treated. The apparatus includes a chamber for receiving a liquid to be treated. The chamber has a settling assembly. The settling assembly has a support frame operably associated with a plurality of inclined plates for supporting the plurality of inclined plates in such a manner as to form a plurality of inclined liquid passageways through which the liquid to be treated is directed to cause impurities to settle out of the liquid to be treated. At least one inclined passageway is formed between a pair of adjacent inclined plates. At least one orifice is formed in each of the plurality of inclined plates through which effluent passes. A support member is operably associated with each of the plurality of inclined plates for supporting a corresponding inclined plate on the support frame. Each of the support members extends along an upper portion of a corresponding inclined plate. At least a first portion of each of the support members extends outwardly from a corresponding inclined plate. Each of the first portions of the support members rests on top of a support surface of the support frame.

Yet still a further preferred embodiment of the present invention is directed to an apparatus for removing impurities from a liquid to be treated. The apparatus includes a chamber for receiving a liquid to be treated. The chamber has a settling assembly. The settling assembly has a support frame operably associated with a plurality of inclined plates for supporting the plurality of inclined plates in such a manner as to form a plurality of inclined liquid passageways through which the liquid to be treated is directed to cause impurities to settle out of the liquid to be treated. At least one inclined passageway is formed between a pair of adjacent inclined plates.

A support member is operably associated with each of the plurality of inclined plates for supporting a corresponding inclined plate on the support frame. Each of the inclined plates has at least one opening formed therein. The at least one opening is configured to receive at least a portion of a corresponding support member to connect the corresponding support member to a corresponding inclined plate.

BRIEF DESCRIPTION OF THE DRAWINGS

FIG. 4 is fragmentary cross-sectional view of a preferred form of plate settler taken at a point between the two sides of the plate settler.

FIG. 5 is a perspective view of a preferred form of plate settler.

FIG. 6 is a perspective view of a preferred form of support member.

FIG. 9 is a perspective view of an alternate form of plate settler.

FIG. 10 is perspective view of a preferred form of support member to be used with the plate settler depicted in FIG. 9.

DETAILED DESCRIPTION OF THE PREFERRED EMBODIMENTS OF THE INVENTION

The preferred forms of the invention will now be described with reference to FIGS. 1-11. The appended claims are not limited to the preferred forms and no term and/or phrase used herein is to be given a meaning other than its ordinary meaning unless it is expressly stated otherwise.

FIGS. 1 through 8

Figure 1:
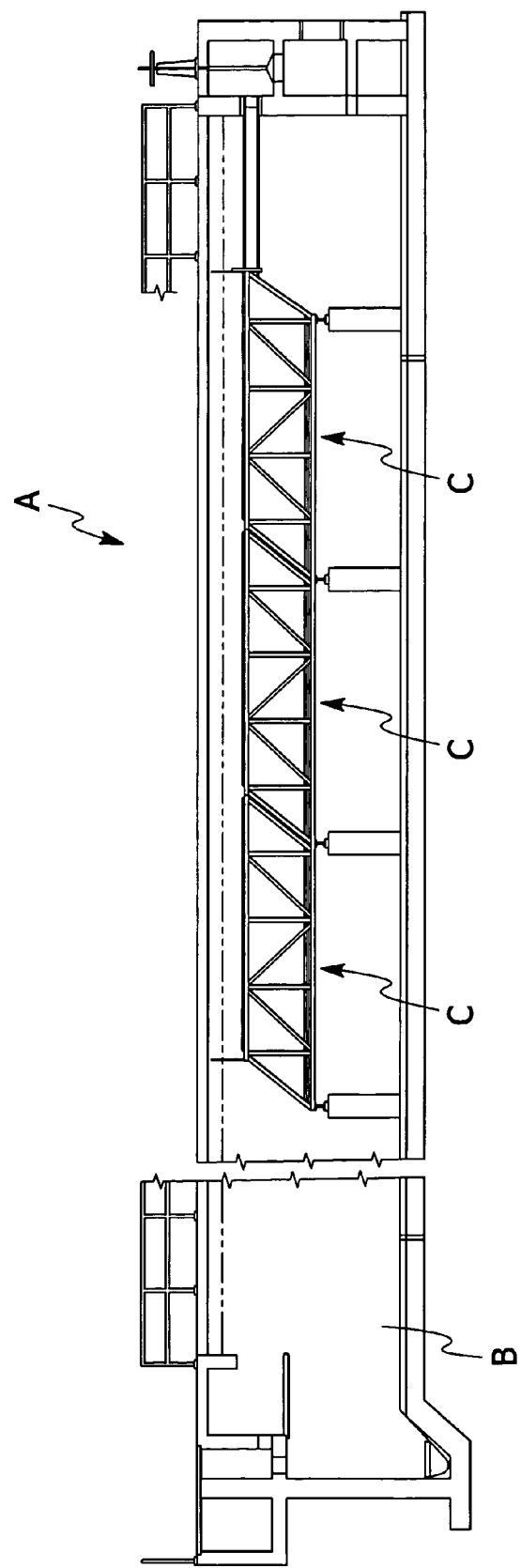
FIG. 1 is a cross-sectional elevation view of a clarifier having a plurality of settling modules.

Referring to FIG. 1, a filter system A employing a preferred form of the invention is illustrated in one of many possible configurations. Filter system A includes a tank B and one or more settling plate assemblies C (three of which are shown in FIG. 1 by way of example). Influent, i.e., the fluid to be treated, is directed into tank B through a well-known influent inlet. One or more effluent troughs may be used with one or more settling assemblies C to receive the effluent flowing from the settling assemblies C. The number and location of the effluent toughs may be varied as desired. For example, an effluent trough can be located between two settling assemblies placed side-by-side. One alternative arrangement is to provide a pair of effluent troughs with one effluent trough disposed adjacent each side of a settling assembly C.

Figure 2:
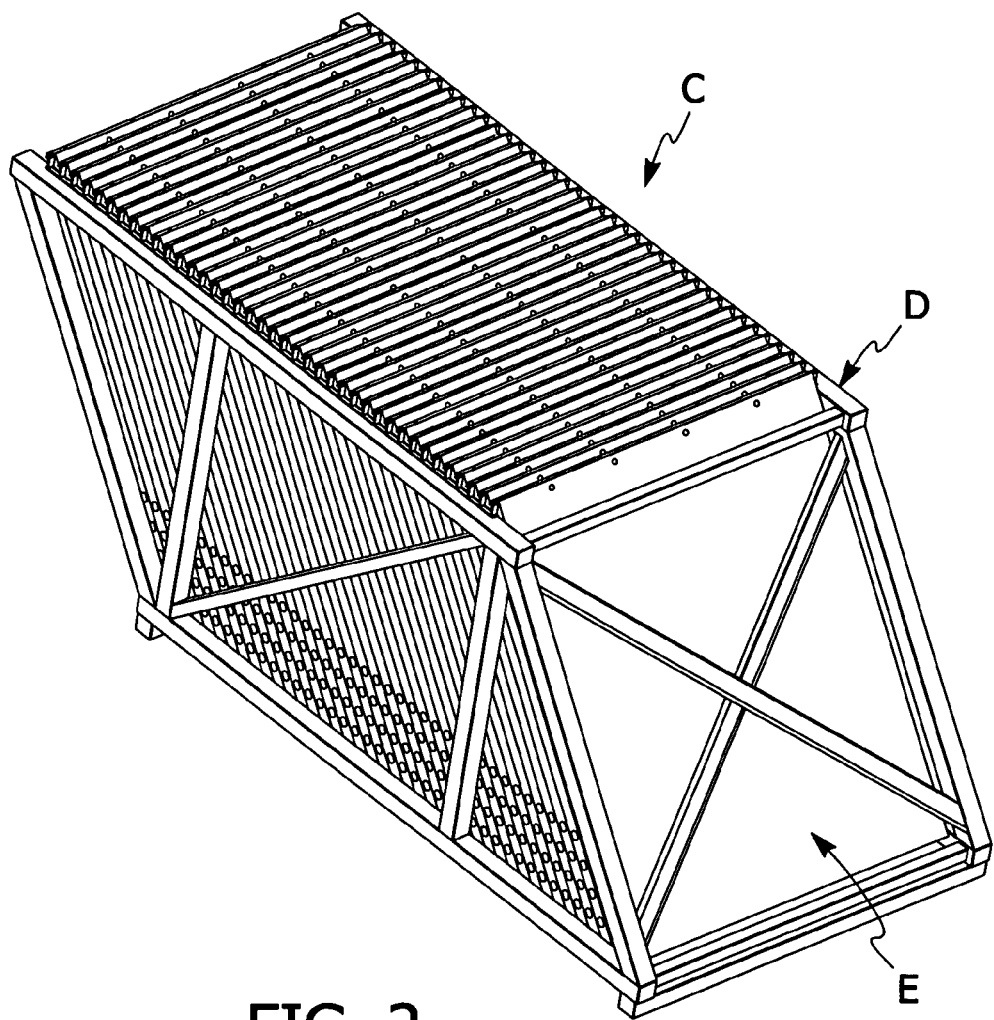
FIG. 2 is a perspective view of a settling module formed in accordance with a preferred embodiment of the present invention.
Figure 3:
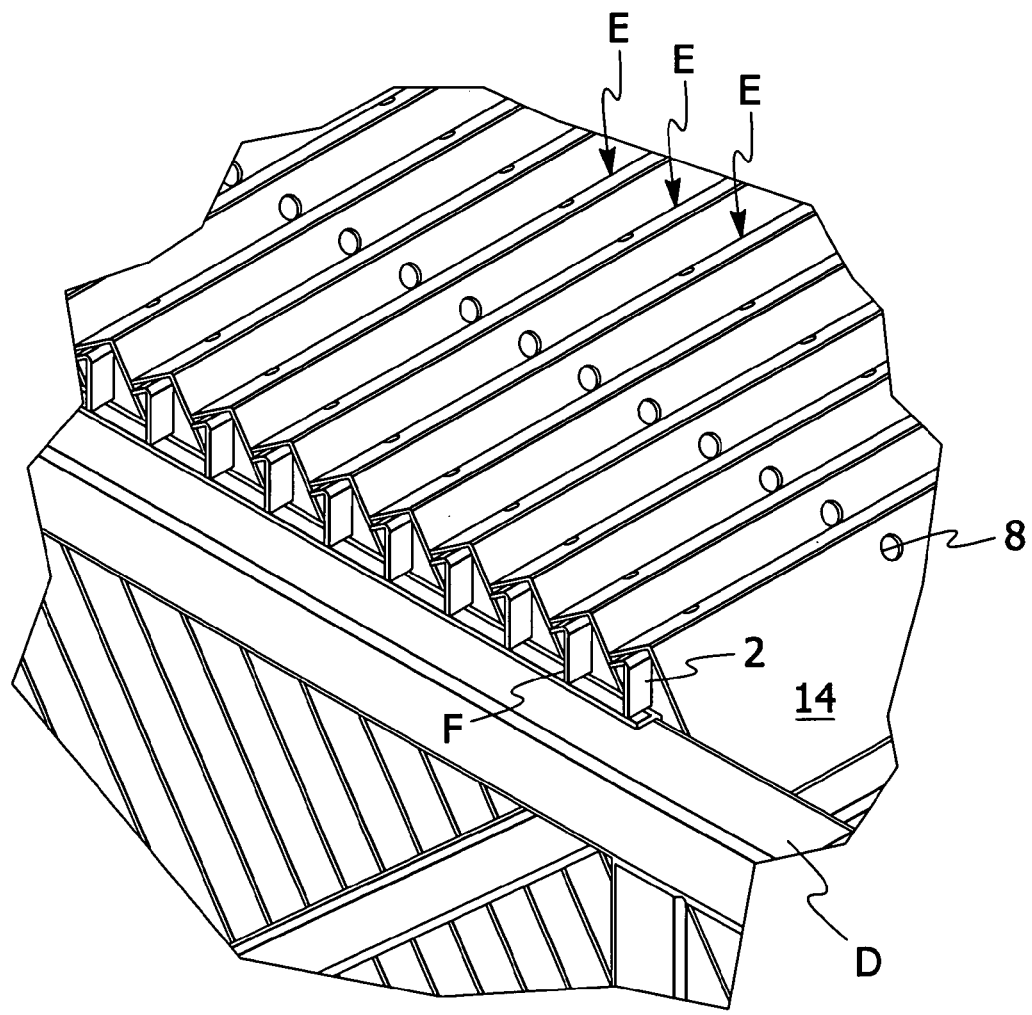
FIG. 3 is a fragmentary, enlarged, perspective view of a settling module formed in accordance with a preferred embodiment of the present invention.

As best seen in FIGS. 2 and 3, settling assembly C includes a support frame D supporting a plurality of settling plates E in an inclined manner to form a plurality of inclined fluid passageways between a pair of adjacent settling plates E.

Figure 7:
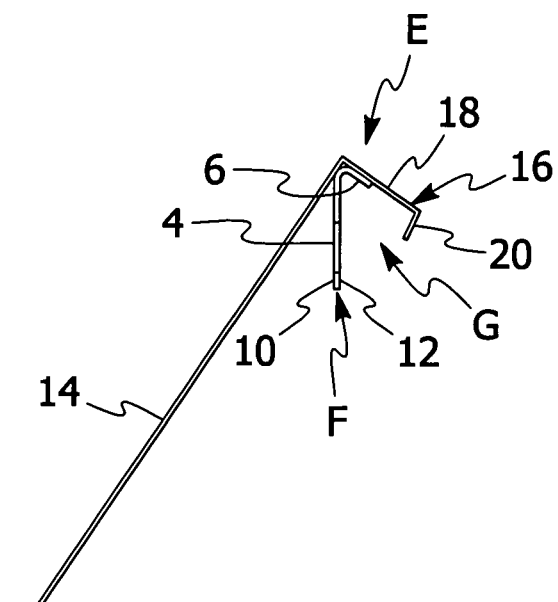
FIG. 7 is fragmentary cross-sectional view taken at a point between the two sides of the plate settler and illustrating the interrelationship between the preferred forms of the support member and inclined plate settler.
Figure 8:
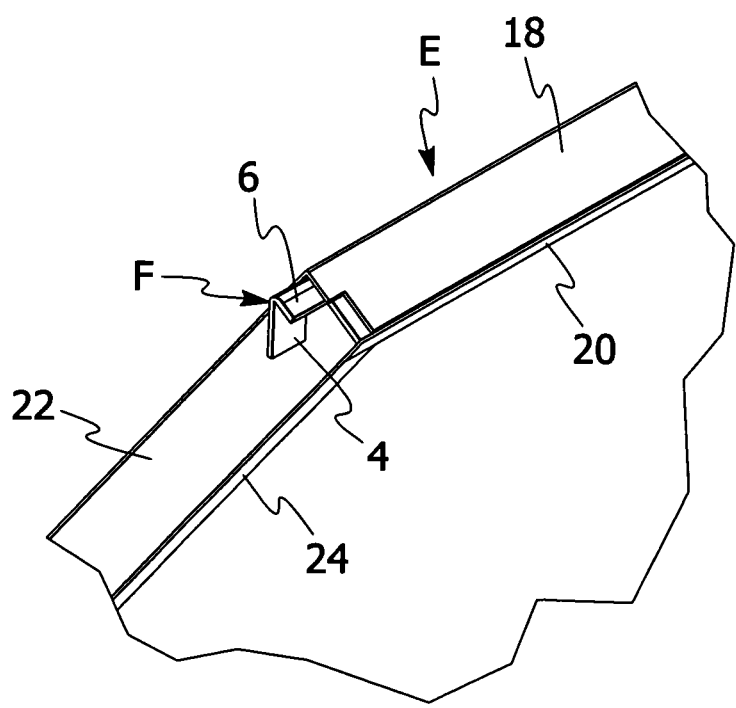
FIG. 8 is a fragmentary, enlarged, perspective view of a preferred form of plate settler and support member.

Referring to FIGS. 3, 6 and 7, a support member F is associated with each settling plate E. Preferably, all support members F have a similar construction, therefore, only one will be described in detail. As is readily evident from FIGS. 3 and 5 to 7, support member F extends along the upper portion of a corresponding settling plate E. Support member F has first and second over-hang portions 2 (only one of which is shown) each of which extends outwardly beyond the left and right sides of the settling plate E. Each over-hang portion rests on top of a corresponding side of support frame D. No connector is needed to secure support members F to support frame D. Referring to FIGS. 3, 6 and 7, support member F includes a first section, segment or portion 4 and a second section, segment or portion 6. As readily seen in FIG. 7, sections 4 and 6 preferably form an angle of less than 90 degrees. Preferably, first portion 4 and second portion 6 are formed from a single piece of metal. However, it will be readily understood that any suitable material may be used. Further, it should be noted that support F could consist of just portion 4.

Portion 4 of support member F preferably is a baffle that enhances filtration and clarification. Specifically, portion 4 will positively affect the flow of influent around and about portion 4. Preferably, the lower edge of portion 4 is below the effluent orifices 8 formed in the corresponding settling plate E. Orifices, ribs (horizontal or vertical orientation or a combination thereof, e.g. a curved or serpentine shaped rib having both horizontal and vertical components) or vanes (horizontal or vertical orientation or a combination thereof, e.g. a curved or serpentine shaped vane having both horizontal and vertical components) may be formed in or on baffles 4 to positively affect flow of influent around and about baffles 4 to further enhance filtration or clarification.

Baffle 4 includes two opposing settling surfaces 10 and 12 that increase the effective settling surface area of settling assembly C to enhance filtration or clarification. Settling surfaces 10 and 12 run the entire width of settling plates E.

The preferred form of settling plates E will now be described in detail. Referring to FIGS. 4, 5, 7 and 8, settling plates E include a body portion 14 having left and right side edges. Body portion 14 includes a settling surface upon which impurities in the influent settle. An upper lip or flange 16 extends outwardly from an uppermost surface of body portion 14. Flange 16 includes a first segment 18 which preferably forms approximately a 90 degree angle with body portion 14 and a second segment 20 that preferably forms an angle 21 (best seen in FIG. 4) greater than 90 degrees with first segment 18. By orienting second segment 20 in this manner relative to first portion 18, flange 16 forms a closing relationship with body portion 14 of an adjacent settling plate E when flange 16 rests on body portion 14 during operation of the filtration system, i.e., this preferred design is free of any gaps formed between adjacent inclined plates E that are of sufficient size to affect headloss. Rather, this preferred embodiment controls headloss solely through orifices 8.

A side lip or flange 22 extends from each side edge of body portion 14. An inwardly extending lip or flange 24 is connected to each side flange 22. Flange 24 can be oriented at an angle greater than 90 degrees to flange 22 to also assist in creating a closing relationship to prevent the gaps previously discussed from forming between adjacent inclined plates. Referring to FIG. 5, each side flange 22 includes an opening 26 configured to substantially resemble the cross-section of support member F so that support member can be readily slid through the openings 26 to connect support member F to the corresponding settling plate E. Where desired, the support member F can be further secured to settling plate E. However, even where further fastening means is used, the openings 26 and mating configuration of support member F allows one to easily and readily connect the support member F and settling plate E thereby reducing assembly time.

Referring to FIG. 7, when support member F is connected to the corresponding settling plate E, segment 18 of flange 16 rests directly on top of portion 6 of support member F. Segment 18 defines the uppermost portion of the inclined liquid passageway. As seen in FIG. 7, no portion of support member F extends above the uppermost portion of the inclined liquid passageway.

Again, referring to FIG. 7, baffle 4 and segment 18 of flange 16 form a quiescent zone G in the space therebetween in which additional settling of impurities can take place to further enhance filtration or clarification.

Referring to FIG. 5, a plurality of openings 28 are formed in the lower sections of side flanges 22. Influent to be treated passes through openings 28 to enter the inclined liquid passageways formed between a pair of adjacent settling plates E. As the influent travels upwardly the impurities settle onto the settling surface of body portion 14 of settling plates E. Effluent passes out through orifices 8 formed in body portion 14 of settling plates E enroute to one or more effluent troughs or other collection devices. Baffle 4 and quiescent zone G enhance filtration or clarification in the manner described above. Preferably, settling plate E is formed from a single piece of sheet metal.

Figure 11:
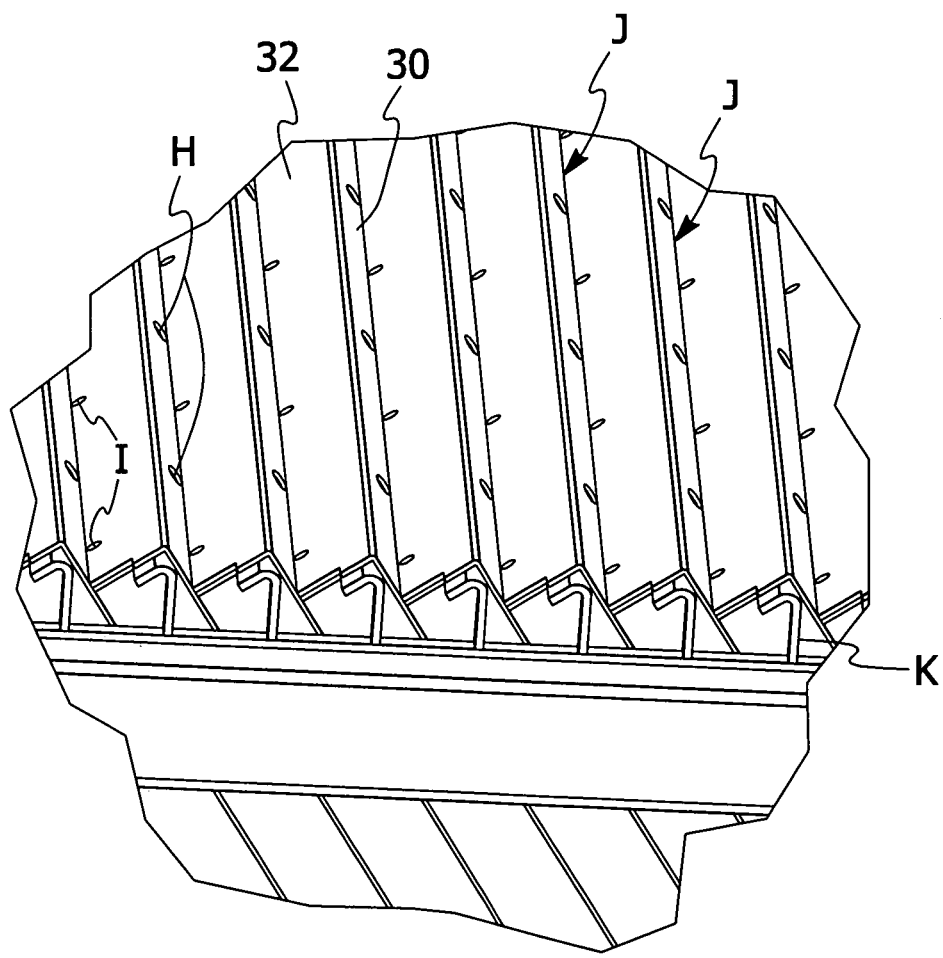
FIG. 11 is a fragmentary, enlarged, perspective view of a settler module having plate settlers of the type depicted in FIG. 9.

FIGS. 9 through 11

The alternative embodiments of the present invention will now be described with references to FIGS. 9 through 11. This embodiment is very similar to the embodiment disclosed in FIGS. 1 to 8, therefore, only the differences will be described in detail. In this embodiment, two sets of effluent orifices H and I are employed through which effluent passes enroute to an effluent trough or similar collection device. It is to be noted that the set of effluent orifices H are formed in body portion 30 of settling plate J while the set of effluent orifices I are formed in upper flange 32 of settling plate J. Preferably, flange 32 is oriented at approximately a 90 degree angle to body portion 30. By providing two sets of effluent orifices, one can readily adjust headloss as desired. Also, forming the orifices in surfaces having different orientations allows one to further vary headloss as desired. Support member K has an identical construction to support member F.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

We claim:
1. An apparatus for removing impurities from a liquid to be treated, said apparatus comprising:
(a) a chamber for receiving a liquid to be treated, said chamber having a settling assembly, said settling assembly having a support frame operably associated with a plurality of inclined plates for supporting said plurality of inclined plates in such a manner as to form a plurality of inclined liquid passageways through which the liquid to be treated is directed to cause impurities to settle out of the liquid to be treated, at least one inclined passageway is formed between a pair of adjacent inclined plates, each of said inclined plates having a flange that rests on an adjacent inclined plate, at least one orifice being formed in each of said plurality of inclined plates through which effluent passes; and,
(b) a support member operably associated with each of said plurality of inclined plates for supporting a corresponding inclined plate on said support frame, at least a portion of each of said support members abuts an inner surface of a corresponding flange; and,
each of said flanges extend outwardly from a body of a corresponding inclined plate, each of said flanges include a first segment and a second segment, said first segment and said second segment form an inner angle greater than 90 degrees to ensure a closing type relationship between adjacent inclined plates to prevent any gaps of sufficient size to affect headloss forming between said flanges and the adjacent inclined plates that said flanges rest on.

2. An apparatus as set forth in claim 1, wherein:
(a) said first segment forms an uppermost portion of a corresponding inclined passageway.

3. An apparatus as set forth in claim 2, wherein:
(a) at least one orifice is formed in said first segment of each of said first flanges through which effluent passes.

4. An apparatus as set forth in 2, wherein:
(a) each of said support members includes a first portion and a second portion, said first segment of a corresponding flange rests on and is supported by said first portion of a corresponding support member.

5. An apparatus as set forth in claim 4, wherein:
(a) said first portion of each of said support members forms an angle less than 90 degrees with said second portion of a corresponding support member.

6. An apparatus as set forth in claim 5, wherein:
(a) said second portion of each of said support members extends downwardly into a corresponding inclined passageway, each of said second portions includes at least one settling surface for promoting settling of impurities from the liquid being treated.

7. An apparatus as set forth in claim 6, wherein:
(a) said second portion of each of said support members is spaced from a body of a corresponding inclined plate supported by said support member, said body having a settling surface.

8. An apparatus as set forth in claim 7, wherein:
(a) said second portion of each of said support members forms an angle of greater than 0 degrees and less than 180 degrees with said first segment of said flange of a corresponding inclined plate supported by said support member.

9. An apparatus for removing impurities from a liquid to be treated, said apparatus comprising:
(a) a chamber for receiving a liquid to be treated, said chamber having a settling assembly, said settling assembly having a support frame operably associated with a plurality of inclined plates for supporting said plurality of inclined plates in such a manner as to form a plurality of inclined liquid passageways through which the liquid to be treated is directed to cause impurities to settle out of the liquid to be treated, at least one inclined passageway is formed between a pair of adjacent inclined plates, each of said inclined plates having a flange that rests on an adjacent inclined plate, at least one orifice being formed in each of said plurality of inclined plates through which effluent passes;

(b) a support member operably associated with each of said plurality of inclined plates for supporting a corresponding inclined plate on said support frame, at least a portion of each of said support members abuts an inner surface of a corresponding flange;

(c) a clarification enhancement member extending into each of said plurality of inclined liquid passageways for enhancing removal of impurities from the liquid being treated, each of said clarification enhancement members being disposed such that no portion of said clarification enhancement member extends above a corresponding inclined passageway, at least a portion of each of said clarification enhancement members is spaced from each settling surface formed on a pair of adjacent inclined plates forming a corresponding inclined passageway; and, each of said supports members includes a first segment operably connected to a second segment, said first segment forming an internal angle less than ninety degrees with said second segment.

10. An apparatus as set forth in claim 9, wherein:
(a) said clarification enhancement member includes at least one of the following: (i) one or more orifices and (ii) one or more vanes.

11. An apparatus as set forth in claim 9, wherein:
(a) said support member is formed from one piece with a corresponding clarification enhancement member.

12. An apparatus for removing impurities from a liquid to be treated, said apparatus comprising:
(a) a chamber for receiving a liquid to be treated, said chamber having a settling assembly, said settling assembly having a support frame operably associated with a plurality of inclined plates for supporting said plurality of inclined plates in such a manner as to form a plurality of inclined liquid passageways through which the liquid to be treated is directed to cause impurities to settle out of the liquid to be treated, at least one inclined passageway is formed between a pair of adjacent inclined plates, each of said inclined plates having a flange that rests on an adjacent inclined plate, at least one orifice being formed in each of said plurality of inclined plates through which effluent passes;

(b) a support member operably associated with each of said plurality of inclined plates for supporting a corresponding inclined plate on said support frame, at least a portion of each of said support members abuts an inner surface of a corresponding flange, at least a portion of said support member rests on said support frame, each of said inclined plates and corresponding support members being formed such that a corresponding support member can be removably attached to a corresponding inclined plate without any additional means other than said corresponding inclined plate and said corresponding support member, said support member being unattached to said support frame such that each of the plurality of inclined plates and the corresponding support member can be readily removed from said support frame by merely raising each of the plurality of inclined plates.

13. An apparatus as set forth in claim 12, wherein:
(a) at least one of said plurality of inclined plates is formed from a single piece of metal.

14. An apparatus as set forth in claim 13, wherein:
(a) at least one of said support members is formed from a single piece of metal.

15. An apparatus for removing impurities from a liquid to be treated, said apparatus comprising:
(a) a chamber for receiving a liquid to be treated, said chamber having a settling assembly, said settling assembly having a support frame operably associated with a plurality of inclined plates for supporting said plurality of inclined plates in such a manner as to form a plurality of inclined liquid passageways through which the liquid to be treated is directed to cause impurities to settle out of the liquid to be treated, at least one inclined passageway is formed between a pair of adjacent inclined plates, each of said inclined plates having a flange that rests on an adjacent inclined plate, at least one orifice being formed in each of said plurality of inclined plates through which effluent passes;

(b) a support member operably associated with each of said plurality of inclined plates for supporting a corresponding inclined plate on said support frame, at least a portion of each of said support members abuts an inner surface of a corresponding flange, a first portion of at least one of said support members extends into a corresponding inclined passageway, said first portion of said support member having first and second settling surfaces, each of said first and second settling surfaces being spaced from a settling surface of an inclined plate supported by said support member having said first portion.

16. An apparatus as set forth in claim 15, wherein:
(a) said support frame includes first and second spaced sides, each of said support members include a first support section that rests on said first side of said support frame, each of said support members includes a second support section that rests on said second side of said support frame, each of said plurality of inclined plates are disposed between said first side and said second side of said support frame.

17. An apparatus for removing impurities from a liquid to be treated, said apparatus comprising:
(a) a chamber for receiving a liquid to be treated, said chamber having a settling assembly, said settling assembly having a support frame operably associated with a plurality of inclined plates for supporting said plurality of inclined plates in such a manner as to form a plurality of inclined liquid passageways through which the liquid to be treated is directed to cause impurities to settle out of the liquid to be treated, at least one inclined passageway is formed between a pair of adjacent inclined plates, each of said inclined plates having a flange that rests on an adjacent inclined plate, at least one orifice being formed in each of said plurality of inclined plates through which effluent passes;

(b) a support member operably associated with each of said plurality of inclined plates for supporting a corresponding inclined plate on said support frame, at least a portion of each of said support members abuts an inner surface of a corresponding flange; and, (c) a baffle extending downwardly into one of said inclined passageways, said baffle being disposed in an upper portion of a corresponding inclined passageway, said baffle being operably connected to a corresponding support member.

18. An apparatus as set forth in claim 17, wherein:
(a) said baffle and said corresponding support member are formed from a single piece of material.

19. An apparatus for removing impurities from a liquid to be treated, said apparatus comprising:
(a) a chamber for receiving a liquid to be treated, said chamber having a settling assembly, said settling assembly having a support frame operably associated with a plurality of inclined plates for supporting said plurality of inclined plates in such a manner as to form a plurality of inclined liquid passageways through which the liquid to be treated is directed to cause impurities to settle out of the liquid to be treated, at least one inclined passageway is formed between a pair of adjacent inclined plates, each of said inclined plates having a flange that rests on an adjacent inclined plate, at least one orifice being formed in each of said plurality of inclined plates through which effluent passes;
(b) a support member operably associated with each of said plurality of inclined plates for supporting a corresponding inclined plate on said support frame, at least a portion of each of said support members abuts an inner surface of a corresponding flange, each of said support members extend along an upper portion of a corresponding inclined plate, at least a first portion of each of said support members extends outwardly from a corresponding inclined plate, each of said first portions of said support members rests on an uppermost surface of said support frame.

20. An apparatus for removing impurities from a liquid to be treated, said apparatus comprising:
(a) a chamber for receiving a liquid to be treated, said chamber having a settling assembly, said settling assembly having a support frame operably associated with a plurality of inclined plates for supporting said plurality of inclined plates in such a manner as to form a plurality of inclined liquid passageways through which the liquid to be treated is directed to cause impurities to settle out of the liquid to be treated, at least one inclined passageway is formed between a pair of adjacent inclined plates, each of said inclined plates having a flange that rests on an adjacent inclined plate, at least one orifice being formed in each of said plurality of inclined plates through which effluent passes;
(b) a support member operably associated with each of said plurality of inclined plates for supporting a corresponding inclined plate on said support frame, at least a portion of each of said support members abuts an inner surface of a corresponding flange, each of said inclined plates having a side lip extending from at least one side of an inclined body portion, said side lip having at least one opening formed therein, said at least one opening being configured to receive at least a portion of a corresponding support member to connect the corresponding support member to a corresponding inclined plate.

21. An apparatus for removing impurities from a liquid to be treated, said apparatus comprising:
(a) a chamber for receiving a liquid to be treated, said chamber having a settling assembly, said settling assembly having a support frame operably associated with a plurality of inclined plates for supporting said plurality of inclined plates in such a manner as to form a plurality of inclined liquid passageways through which the liquid to be treated is directed to cause impurities to settle out of the liquid to be treated, at least one inclined passageway is formed between a pair of adjacent inclined plates, each of said inclined plates having a flange that rests on an adjacent inclined plate, at least one orifice being formed in each of said plurality of inclined plates through which effluent passes;
(b) a support member operably associated with each of said plurality of inclined plates for supporting a corresponding inclined plate on said support frame, at least a portion of each of said support members abuts an inner surface of a corresponding flange, each of said inclined plates having at least one opening formed therein, said at least one opening being configured to receive at least a portion of a corresponding support member to connect the corresponding support member to a corresponding inclined plate, said support member includes a first portion and a second portion, an inner angle less than 90 degrees and greater than 0 degrees is formed between said first portion and said second portion.

22. An apparatus as set forth in claim 21, wherein:
(a) each of said inclined plates includes at least one side lip extending from a side of a corresponding inclined plate, said opening being formed in said at least one side lip.

23. An apparatus as set forth in claim 21, wherein:
(a) each of said inclined plates includes first and second side lips extending from first and second sides of a corresponding inclined plate, each of said first and second side lips having an opening configured to receive at least a portion of a corresponding support member to connect the corresponding support to a corresponding inclined plate.

* * * * *